United States Patent [19]

Zobele

[11] 4,251,714

[45] Feb. 17, 1981

[54] HEATING DEVICE FOR TABLETS CONTAINING EVAPORABLE SUBSTANCES

[75] Inventor: Fulvio Zobele, Trento, Italy

[73] Assignee: Zobele Industrie Chimiche S.p.A., Trento, Italy

[21] Appl. No.: 817,167

[22] Filed: Jul. 20, 1977

[51] Int. Cl.³ .......................... H05B 3/28; B01J 7/00; A01M 19/00

[52] U.S. Cl. ..................... 219/275; 43/129; 219/457; 219/521; 219/534; 219/544; 422/305; 422/306; 338/252; 338/253; 338/268; 338/276

[58] Field of Search .................. 219/455, 457–459, 219/464, 521, 534, 544, 436, 438, 271–276, 54; 338/252, 253, 267, 268, 269, 270, 273, 276, 311, 313; 21/117, 119, 120; 43/128–130; 422/306, 305; 128/192

[56] References Cited

U.S. PATENT DOCUMENTS

| 1,463,005 | 7/1923 | Dalton | 338/269 |
|---|---|---|---|
| 1,509,561 | 9/1924 | Lothamer | 219/521 |
| 1,955,963 | 4/1934 | Keim | 422/306 |
| 1,990,640 | 2/1935 | Doherty | 219/464 X |
| 2,230,586 | 2/1941 | Cerny | 338/268 |
| 2,476,113 | 7/1949 | Ramck | 219/438 |
| 2,743,350 | 4/1956 | Wuerfel et al. | 219/275 |
| 2,756,322 | 7/1956 | Sibert | 219/275 |
| 3,551,873 | 12/1970 | Weyenberg | 338/253 |

FOREIGN PATENT DOCUMENTS

| 234954 | 2/1959 | Australia | 422/305 |
|---|---|---|---|
| 813631 | 3/1937 | France | 219/459 |
| 491977 | 3/1954 | Italy | 219/271 |
| 165099 | 1/1934 | Switzerland | 219/457 |
| 293570 | 7/1928 | United Kingdom | 219/457 |
| 890925 | 3/1962 | United Kingdom | 219/271 |

Primary Examiner—A. Bartis

[57] ABSTRACT

A device for heating tables containing an evaporable substance such as scents, deodorizers or insecticides includes an elongated heating support of insulating material having a planar surface and a longitudinal opening therethrough. The heating support is preferably T-shaped, the planar surface being the top of the T. The planar surface is coated with an enamel coating so that residue from the evaporable substances is easily removed. A cylindrical resistance heating element is inserted into the cylindrical opening, the cylindrical element being of a lesser length than the length of the heating support. The arm portions of the T-shaped support may be each provided with a longitudinally extending hole for limiting lateral transfer of heat through the support. Conductors for supplying electricity to the heating element enter the cylindrical opening at a point displaced from the outward edges thereof so that the outward edges of the heating support member is completely insulated. The heating support member with the cylindrical resistance heating element installed is preferably mounted within a nonconductive housing. The conductors of the heating element are preferably connected to electrical connection means such as a plug member associated with the housing in which the heating support member and heating element are mounted.

7 Claims, 8 Drawing Figures

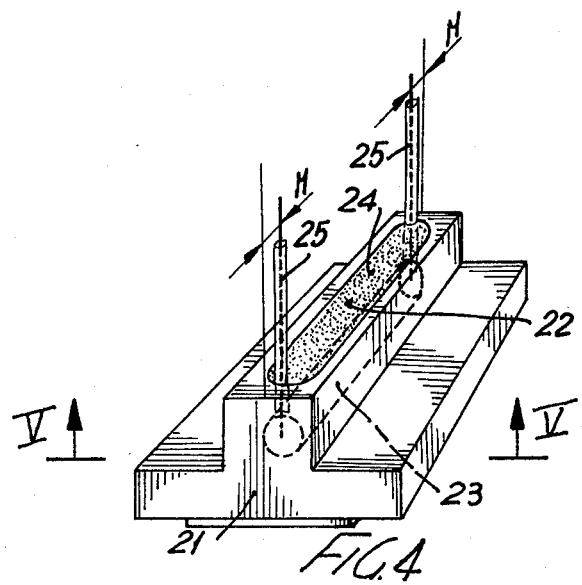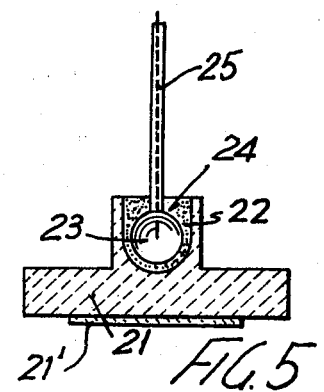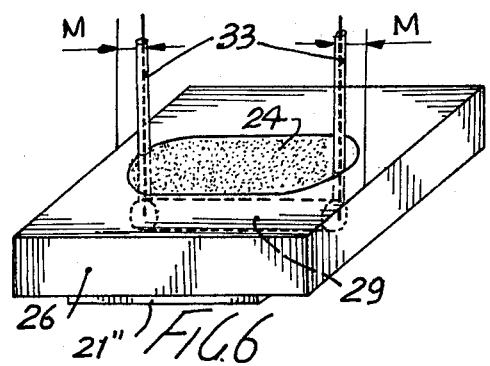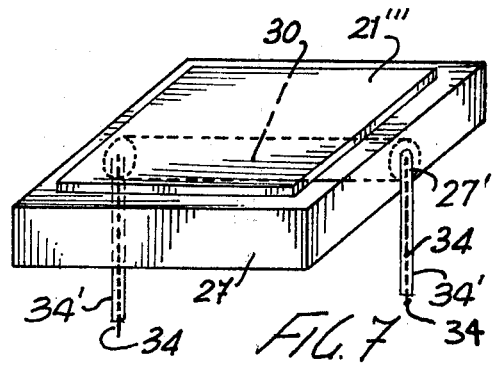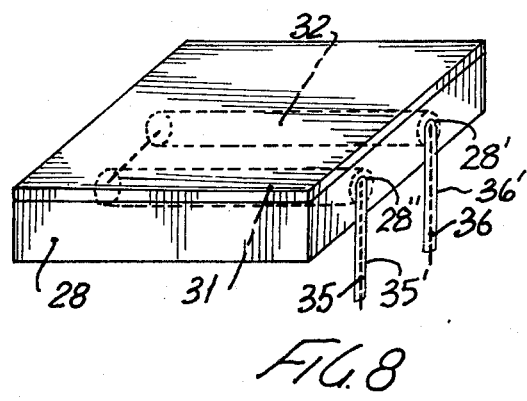

HEATING DEVICE FOR TABLETS CONTAINING EVAPORABLE SUBSTANCES

Various heating devices are presently known and already in use which, by means of an electric resistance that can be placed beneath a base plate, provide for heating tablets containing materials, which are released by evaporation, such as scented, deodorizing or insecticidal substances.

According to the prior art, such an electric resistance could be wound on an insulating support of a substantially flat shape, and then coated with an insulating enamel to produce a heating plate. However, it was found in practice that such a heating plate suffered from some disadvantages during the processing step, due to the difficulty in providing a perfect electrical insulation.

Another type of heating plate comprises a metal base plate, provided with an electric resistance applied under said base by a metal collar or hooks. However, this system has disadvantages consisting of conductivity of the metal plate which, for safety purposes, should be connected to a grounding jack.

The plate, which is the subject of the present invention, is characterized by using two distinct elements, as inserted in one another, to realize a throughly insulated structure of increased duration but nevertheless more economical.

In accordance with the invention, the heating device comprises a support structure of insulating material having an inverted T-shaped cross section. The stem portion of the T-shaped cross-section comprises a generally circular shaped cross-section and extends longitudinally of the support structure to form a tubular hollow cylinder of insulating material with a flat longitudinally extending base portion located generally tangentially to the tubular shaped portion. A heating element comprising a small hollow cylinder having electrical resistance wire wrapped thereabout is adapted to fit within the tubular-shaped portion of the support member and electrical terminals attached to the electrical resistance wires extend outwardly from the ends of the tubular shaped portion. The generally flat portion of the support member, that is, the base of the T-shaped cross-section, is heated by the internal electrical resistance when current is applied to the resistance wire. The heat causes the evaporation of a tablet which is placed thereon and which is impregnated with an appropriate evaporative substance such as a deodorant or insecticide.

Further in accordance with the invention, the heating device as above described further includes a body for enclosing the previously described support structure. The body is preferably constructed of a plastic insulating material and includes a suitable means for supporting said support structure therewithin. Further, the body includes means such as a standard plug for supplying electrical current to the resistance wires previously described and which are connected thereto. The body may then be connected to a source of electrical supply such as by inserting the plug into a standard wall socket or the like.

The flat surface is enameled with chosen colours, thereby serving both aesthetic and sanitary standpoints, since the enameled surface can be easily and readily cleaned, without absorbing at all either the residues of the evaporated substance or dirt.

Some unrestrictive embodiments of the device will be described hereinafter with reference to the accompanying drawings, in which:

FIG. 4 is a perspective view showing a T-shaped heating support, having an elongated groove in the T leg, accommodating the electric resistance, which is then cemented leaving the two terminals protruding perpendicularly to a bigger surface of the support itself;

FIG. 5 is a cross-sectional view taken along plane V—V of FIG. 4;

FIG. 6 shows a planar heating plate of a substantial uniform thickness, wherein the groove for accommodating the electric resistance and protecting cementing material is formed as in FIG. 4;

Figure 1:
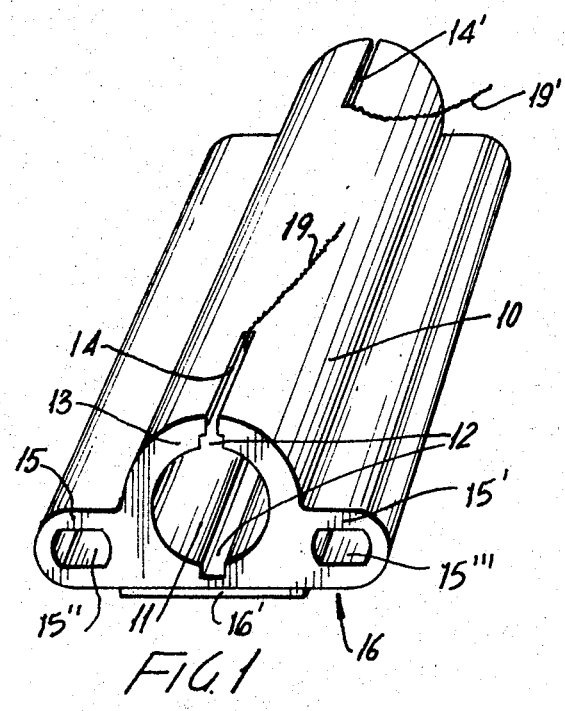
FIG. 1 is a perspective view showing a heating support.

FIG. 7 shows a heating plate similar to that of FIG. 7, but having a through hole in its thickness so as to create a hole similar to that of FIG. 1 but in which hole the electric resistance is cemented and shielded; and FIG. 8 shows a heating plate similar to that of FIG. 7, having in its thickness two parallel through holes with two series connected resistances, the latter being also shielded, and insulated leads outwardly projecting.

Figure 2:
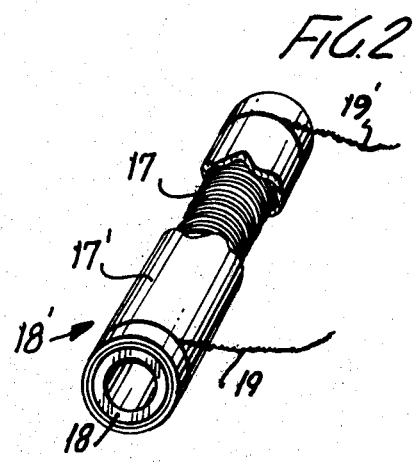
FIG. 2 is a perspective view of the resistance wound up on the cylinder of insulating material.
Figure 3:
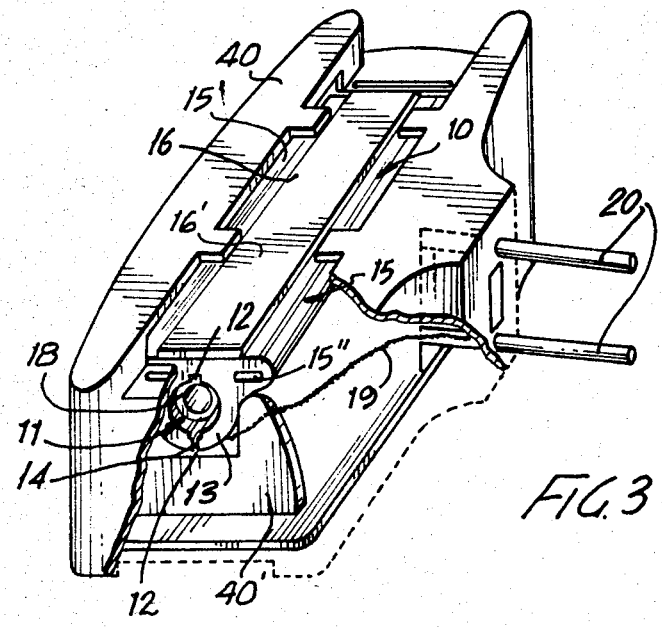
FIG. 3 shows the heating device ready for use.

As shown in FIGS. 1-3, the heating support 10 comprises a T-shaped body of insulating material having a suitable through hole 11 for accommodating resistance 18', comprise by the small cylinder 18 on which the resistance wire 17 is wound up.

In the cylindrical hole 11 of the heating support 10 there are two diametral grooves 12, to guide the introduction of the resistance 18' with the associated terminals 19 and 19'. Grooves 12 are only necessary to accommodate enlarged points of connection of terminals 19, 19' adjacent the resistance 18' such as by solder beads or the like. When terminals 19, 19' extend from the axial ends of resistance 18', no grooves are necessary. In the wall 13 which forms a tubular envelope there are moreover, two notches 14, 14' for allowing the terminals 19, 19' of resistance wire 17 to exit from hole 11. At the two sides of the tubular envelope 13 two extensions or enlargements 15, 15' are provided with holes 15" and 15"' for preventing the heat produced by resistance 18' from spreading to the edges of the support which is mounted in a plastic body 40 of the electric anti-mosquito material vaporizing device. The heating support 10 (FIG. 1) has a planar surface 16 on which the tablet containing the evaporable substances can directly bear. This planar surface 16 is preferably treated with a coating 16' of vitrified enamel of the desired colour. This coating no longer performs as in the past the insulating function for the resistance, since in this device, insulation is assured by the whole assembly of heating support 10. The coating remains sanitary since it cannot become impregnated with dirt.

The heating support 10 is supported by two supporting rails 40' (only one shown) of the body 40. The rails 40' support the T-shaped heating support 10 by the extensions 15 and 15'.

FIG. 2 shows a wire resistance 17 wound around a small insulating hollow cylinder 18 and having two terminals 19, 19' to be respectively connected directly to plugs 20 of the current tap, or through a suitable extension to the electric current tap embedded in a wall. After being wound, said resistance 17 is enameled with an insulating enamel 17'. The length of cylinder 18 is preferably shorter than the heating support 10. In this manner, contact with the ends of cylinder 18 is avoided. The two terminals 19, 19' extending from cylinder 18 project from the notches 14, 14' at a point displaced inwardly from the outward edges of the support member 10.

In FIGS. 4 and 5 there is shown a heating plate 21, having a groove 22 for accommodating a resistance 23, the latter being then protected with cement 24. In said groove 22, instead of laterally projecting, the two terminals 25, 25' project at some distance (M) from the edge of heating plate 21. The plate 21 has a coating 21' of vitrified enamel on one surface thereof.

FIG. 6 shows the heating plate 21 of parallelepiped shape with hole 22 provided therein for insertion of the resistance 23. The hole 22 is filled with the insulating cement 24 after the resistance has been inserted. The heating support 21 has a coating 21" of vitrified enamel on one surface thereof.

On the other hand, in FIGS. 7 and 8 the heating plates 27 and 28 are of parallelepiped shape respectively, and one or two holes 27' or 28', 28" are provided therein for the insertion of resistances 30 or 31 and 32, the terminals 34, 35 and 36 of which exit through the sides of the plate. Terminals 34, 35 and 36 are covered with insulation 34', 35' and 36', respectively. Heating plates 27 and 28 each have an enamel coating 21''', 21'''', respectively on their upper surface.

This approach is less complete and striking than that of FIGS. 4, 5 and 6, but can be adopted should the plate be fitted on a plastic apparatus for protection of the two ends from which the wires exit. The top face of each plate can be enameled to complete the features and advantages of the device.

What I claim is:

1. A heating device for evaporating substances, such as scents, deodorants or insecticides comprising an elongated, rectangular heating support having a T-shaped cross section and formed of electrical insulation material, a longitudinally extending hole disposed centrally in said heating support, a resistance heating element wound on a core, said heating element being housed within said hole in said heating support and extending longitudinally therewithin, said heating element having a pair of terminals extending to the exterior of said support, said support having an upper face portion forming a rectangular bearing plane for receiving and supporting the material to be evaporated, arm portions of said T-shaped support each being provided with a longitudinally extending hole for limiting lateral transfer of heat through said support, said support being mounted within a housing of electrical insulation material, said housing including an open top, said support being positioned in said housing with said rectangular bearing plane of said support being exposed through the open top of said housing, said housing including an integral connector plug means adapted to be connected to a current tap, said pair of heating element terminals being electrically connected to said plug means.

2. A device according to claim 1 characterized in that said core upon which said resistance is wound comprises a cylinder, said hole in said heating support having two axial grooves for guiding the insertion of said heating element into the hole.

3. A device according to claim 1 characterized by said heating support having its upper flat surface covered by a coating of enamel for preventing absorption of the substance supported thereon by the support.

4. A device according to claim 1 characterized by said pair of terminals exiting from radially disposed notches in said heating support, which notches extend radially outwardly from said hole in a base portion of said T-shaped support at a point below said upper face portion.

5. A heating device for evaporating substances such as scents, deodorants or insecticides comprising an elongated rectangular heating support of electrical insulation material, having a T-shaped transverse cross-section, the leg portion of the T-shaped cross-section having a longitudinally extending hole therein for receiving and protecting a heating element, said heating support having an upper surface formed by the extended arm portions of said T-shaped support, said upper surface being flat and elongated and covered with a coating of enamel for preventing absorption of the substances to be supported thereon, said heating element having a pair of terminals extending to the exterior of said support, said support being mounted within a housing of electrical insulation material including an open top, said heating support being positioned within said housing with said upper surface of said support being exposed through said open top, said housing including an integral connector plug means adapted to be connected to a current tap and said pair of heating element terminals being electrically connected to said plug means.

6. A device according to claim 5 wherein the longitudinally extending hole within said support includes two notches communicating with the interior of said hole from the exterior of the leg portion of the T-shaped heating support, each notch forming a passage through which one of said pair of terminals of said heating element extends to the exterior of said heating support.

7. The device according to claim 5 wherein said housing includes support members for mounting said heating support within said housing, said support members contacting said heating support at the extended arm portions thereof.

* * * * *